United States Patent [19]

Hudis

[11] 4,132,829
[45] Jan. 2, 1979

[54] PREPARATION OF DIELECTRIC COATINGS OF VARIABLE DIELECTRIC CONSTANT BY PLASMA POLYMERIZATION

[76] Inventors: James C. Fletcher, Administrator of the National Aeronautics and Space Administration, with respect to an invention of Martin Hudis, Wauwatosa, Wis.; Theodore Wydeven, Sunnyvale, Calif.

[21] Appl. No.: 767,912

[22] Filed: Feb. 11, 1977

Related U.S. Application Data

[62] Division of Ser. No. 589,172, Jun. 23, 1975, abandoned.

[51] Int. Cl.² ............................................. B05D 3/06
[52] U.S. Cl. ..................................... 428/411; 427/41; 427/294
[58] Field of Search .................... 427/41, 294; 428/411

[56] References Cited

U.S. PATENT DOCUMENTS

| 3,252,830 | 5/1966 | Cummin et al. ................... 427/12 X |
| 3,518,108 | 6/1970 | Heiss et al. ............................. 427/41 |

*Primary Examiner*—Bernard D. Pianalto
*Attorney, Agent, or Firm*—Darrell G. Brekke; John R. Manning; Armand McMillan

[57] ABSTRACT

A plasma polymerization process for the deposition of a dielectric polymer coating on a substrate comprising disposing the substrate in a closed reactor between two temperature-controlled electrodes connected to a power supply, maintaining a vacuum within the closed reactor, causing a monomer gas or a gas mixture of a monomer and diluent to flow into the reactor, generating a plasma between the electrodes, and varying and controlling the dielectric constant of the polymer coating being deposited by regulating the gas total and partial pressures, the electric field strength and frequency, and the current density. A monomer, such as a polar saturated or unsaturated nitrogen-containing compound, or a monomer and diluent, such as a saturated or unsaturated aliphatic hydrocarbon and nitrogen, can be polymerized to form a dielectric coating having a varying dielectric constant in accordance with this plasma polymerization process.

11 Claims, 7 Drawing Figures

PREPARATION OF DIELECTRIC COATINGS OF VARIABLE DIELECTRIC CONSTANT BY PLASMA POLYMERIZATION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

This is a division, of application Ser. No. 589,172 filed June 23, 1975 and now abandoned.

BACKGROUND OF THE INVENTION

1. Field of the Invention

The invention relates to a novel process for preparing dielectric coatings by the plasma polymerization of a monomer or a monomer and diluent. More particularly, the invention relates to a novel process for preparing dielectric coatings by plasma polymerization whereby the dielectric constant of the polymer coating prepared from a monomer or monomer and diluent can be varied and controlled.

2. Description of the Prior Art

Void-free organic insulators are commonly used for electrical insulating applications, such as capacitors, electrical standoffs and free-throughs. The major problem encountered with such insulators is electrical degradation over time which is often caused by corona at the interface between the insulator and the surrounding gas or liquid. The corona, which is driven by the large electric field at the surface, enhances the decomposition of the organic insulator. The large surface electric field is provided by the large discontinuous change in the dielectric constant across the insulator-gas (or liquid) interface. Organic insulators have large dielectric constants ranging in values from about 3 to 6, while gases have values near 1 and liquids have values in the range of about 2.5 to 6.5. A typical example of the surface electric field across a boundary with a discontinuous change in the dielectric constant is illustrated in FIGS. 1a and 1b. To avoid decomposition and ultimate electric failure of the insulator a reduction in the operating electric field at the surface is required. If the insulator were coated with an organic dielectric film which would eliminate the discontinuous change in the dielectric constant, decomposition of the insulator could be retarded.

This organic dielectric coatings have been produced using electron beam polymerization, photopolymerization and plasma polymerization processes. The measured dielectric constants of the coatings made according to these prior art processes vary with the initial monomer employed but appear to be independent of the polymerization process and deposition conditions used. The following U.S. Patents disclose typical prior art plasma polymerization processes for producing thin organic dielectric coatings: U.S. Pat. Nos. 3,069,283 (Coleman), 3,252,830 (Cummin et al.), and 3,518,108 (Heiss, Jr. et al.). These prior art processes can be used to produce dielectric coatings having a wide range of dielectric constants when using different gases but each gas or gas mixture gives a single value for the dielectric constant. For example, values of the dielectric constants of the dielectric coatings prepared according to the plasma polymerization process disclosed in the Heiss, Jr. et al. patent were found to be in the range of from 2.66 to 5.1.

If an electrical insulator were coated using a prior art polymerization process to reduce corona at its surface, the discontinuous change in the dielectric constant would not be eliminated. Decomposition of the insulator would still occur but at a reduced rate. A reduction in the operating electric field would be required in order to minimize decomposition of the insulator. The electrical characteristics of a coating using a prior art processes are illustrated in FIGS. 2a and 2b.

SUMMARY OF THE INVENTION

The disadvantages and limitations of the dielectric coatings made by the prior art processes are alleviated by the present invention. In accordance with the present invention, the dielectric constant of a polymer coating prepared from a monomer or monomer and diluent can be varied and controlled during deposition by using a plasma polymerization process in which the current density and electron energy, both of which are related to gas pressure and to electric field strength and frequency, are varied and controlled. This eliminates the discontinucus change in the dielectric constant across the interface thereby eliminating the formation of corona.

For a further understanding of the present invention and for advantages and features thereof, reference may be made to the following description in conjunction with the following drawings which show, by way of example, the preferred embodiments of the present invention.

DESCRIPTION OF THE PREFERRED EMBODIMENTS

Figure 1A:
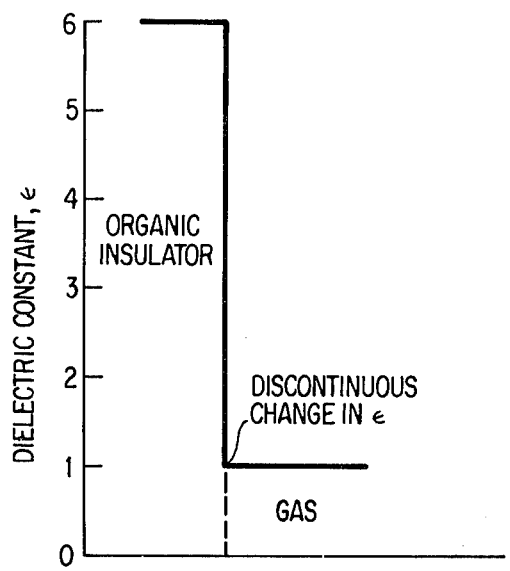
FIG. 1a is a plot of dielectric constant versus distance for an uncoated organic electrical insulator in a gaseous environment.
Figure 1B:
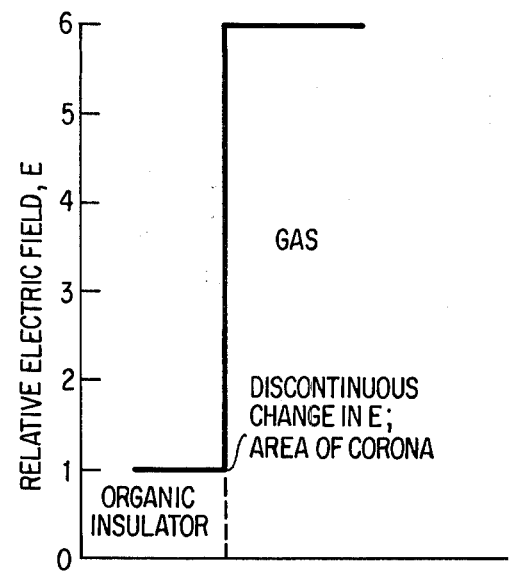
FIG. 1b is a plot of electric field versus distance for an uncoated organic electrical insulator in a gaseous environment.

In accordance with the present invention, a polymer coating is prepared from a monomer or a monomer and diluent by a plasma polymerization process whereby the dielectric constant can be varied and controlled. The dielectric constant is controlled by varying the type of gas plasma, the gas total and partial pressures, and the electric field strength and frequency. These factors affect the current density and electron energy at the object to be coated during the polymerization process.

The plasma polymerization process of the present invention comprises first placing the substrate to be coated in a closed reactor between a pair of temperature-controlled electrodes which are attached to a DC power supply or to a variable frequency AC power supply, and evacuating the reactor to a background gauge pressure of about $10^{-2}$ torr. A monomer or a monomer and diluent in the gas phase are then allowed to flow into the reactor until the desired pressure is reached. The power is then turned on and plasma is generated by means of the electromagnetic energy applied between the electrodes. Deposition of the polymer onto the substrate is continued until the desired thickness of the coating is reached. During deposition of the polymer coating, the reactor is continuously pumped. Following the deposition period, the monomer or monomer and diluent flow are discontinued, the vacuum in the reactor is broken, and the coated substrate is removed.

The monomers which can be used to prepare polymer coatings having high dielectric constants are those monomers having a polar group attached thereto, such as, for example, polar saturated and unsaturated nitrogen-containing compounds such as amines and nitriles, e.g., allylamine and the like. When these monomers are polymerized in accordance with the process of the present invention, polymer coatings having a dielectric constant as high as 7 can be obtained (see Table I).

Using these same monomers, polymer coatings, having dielectric constants which can be varied and controlled, can be prepared in accordance with the process of the invention. As will be discussed later in detail, the dielectric constants of these polymer coatings can be varied and controlled by regulating the polymerization conditions, such as current density and electron energy which are related to the gas plasma used, the gas partial pressures, and the electric field strength and frequency (see Table I).

The monomers which can be used with a diluent to prepare polymer coatings having high dielectric constants are the saturated and unsaturated aliphatic hydrocarbons, such as ethylene, acetylene, ethane and the like. The preferred diluent is nitrogen gas. When these monomers and diluents are polymerized in accordance with the process of the present invention, polymer coatings having a dielectric constant of about 6 can be obtained.

These same monomers with a diluent, such as nitrogen, can be used to prepare polymer coatings having dielectric constants which can be varied and controlled in accordance with the process of the present invention.

Nitrogen can be incorporated into the polymer coating by either of the two embodiments discussed above, i.e., by plasma polymerizing a polar saturated or unsaturated nitrogen-containing compound, such as an amine or a nitrile, or by mixing nitrogen with a saturated or unsaturated aliphatic hydrocarbon monomer during the plasma polymerization process. The presence of nitrogen in the polymer coating, therefore, is another factor that affects the value of the dielectric constant which can be varied and controlled.

It is believed that the concentration and structure of the polar groups incorporated within the polymer film during polymerization determine its dielectric constant. Moreover, it has been found that the concentration and structure of these polar groups can be controlled by varying the current density and electron energy employed during the process (see Tables I and II). It has further been found that current density and electron energy are related to the pressure, an electric field strength and frequency used. It is this observation which broadens the scope and usefulness of the prior art plasma polymerization processes for preparing dielectric polymer coatings. For example, varying the current density from a large value initially to a smaller value during the polymerization process could be used to produce a polymer coating having a large value for the dielectric constant at the surface of the substrate and a progressively smaller value towards the surface of the polymer coating.

It was found that variations in the frequency of the AC electric field below the electron cut-off, i.e. below the frequency at which electrons migrate to the substrate by diffusion, have no effect on the value of the dielectric constant for gas mixtures of a monomer and diluent, such as ethylene and nitrogen. At frequencies lower than the electron cut-off frequency the electrons are swept completely out of the region between the electrodes during each half cycle of the AC field. In other words, the electron mobility is fast relative to the period of the AC field below the electron cut-off frequency.

When using ethylene and nitrogen mixtures, it was also found necessary to operate at frequencies above the electron cut-off to achieve intact polymer coatings with a high breakdown strength. Therefore, with ethylene-nitrogen mixtures the value of the dielectric constant also appears to depend on whether the frequency is above or below the electron cut-off frequency. For this reason, gas mixtures of the monomer and diluent were generally polymerized at radio frequencies. Allylamine films could be formed at both high and low frequencies and the polymer films were intact and had high dielectric constants.

Figure 2A:
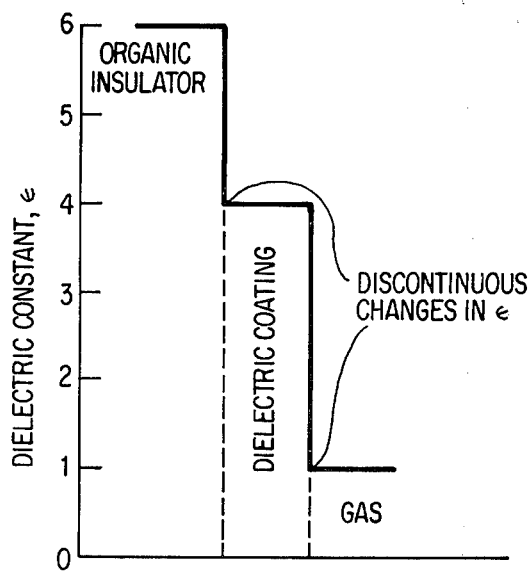
FIG. 2a is a plot of dielectric constant versus distance for an organic electrical insulator and dielectric coating prepared in accordance with a prior art process and used in a gaseous environment.
Figure 2B:
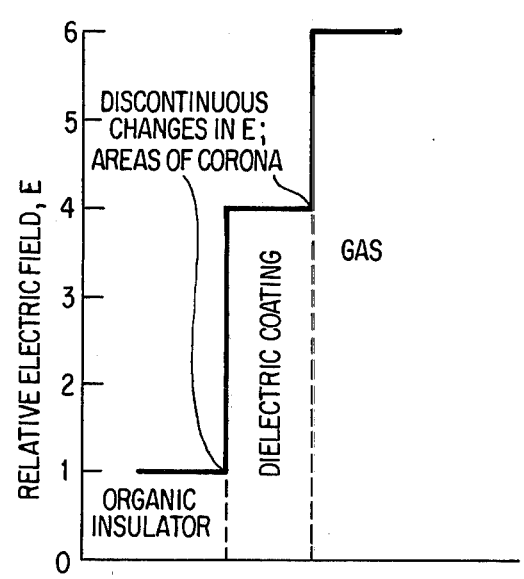
FIG. 2b is a plot of electric field versus distance for an organic electrical insulator and dielectric coating prepared in accordance with a prior art process and used in a gaseous environment.

Referring now to FIG. 2a, which is a plot of dielectric constant versus distance for an organic electric insulator coated with a dielectric polymer film prepared in accordance with a prior art polymerization process, it can be seen that there is an abrupt change in the value of the dielectric constant going from the insulator which has a relatively large dielectric constant value to the polymer coating which has a relatively small dielectric constant value. A similar relationship exists at the coating-gas interface. As can be seen from FIG. 2b which is a plot of electric field versus distance for the same insulator and polymer coating, the change in values of the electric field at the interfaces between the polymer coating and the surrounding gas and polymer coating and insulator are reduced because of the intermediate dielectric constant of the polymer coating. There are, however, abrupt changes in the value of the electric field at the interfaces and it is these abrupt changes which lead to corona and ultimate breakdown of the insulator. In such a polymer coating had been used, a reduction in the operating electric field would be required in order to minimize decomposition of the insulator.

Figure 3A:
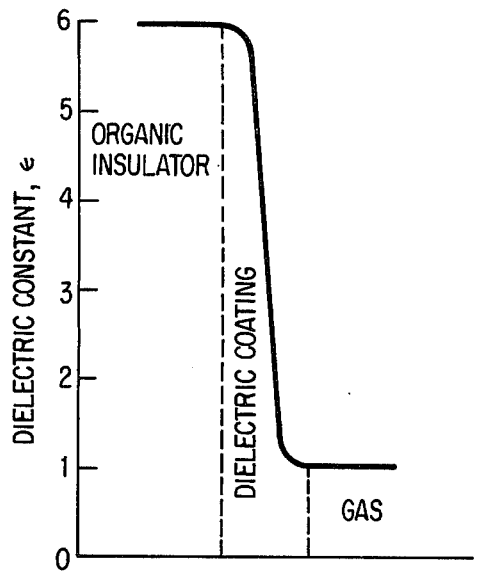
FIG. 3a is a plot of dielectric constant versus distance for an organic electrical insulator and dielectric coating prepared in accordance with the process of the present invention and used in a gaseous environment.
Figure 3B:
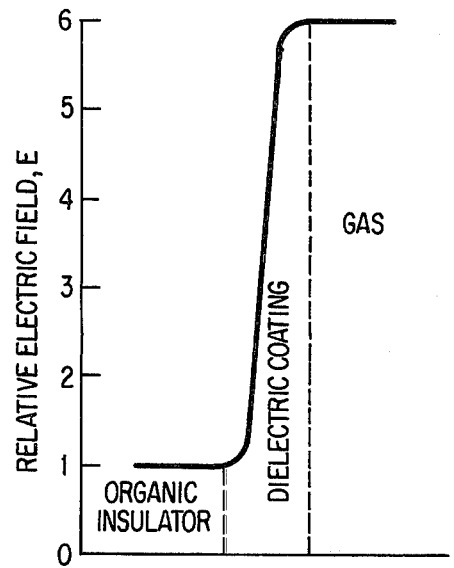
FIG. 3b is a plot of electric field versus distance for an organic electrical insulator and dielectric coating prepared in accordance with the process of the present invention and used in a gaseous environment.

Referring to FIG. 3a, which is a plot of dielectric constant versus distance for an organic electrical insulator coated with a dielectric polymer film prepared in accordance with the polymerization process of the present invention, it can be seen that there are no discontinuous changes in the dielectric constant at the interfaces in going from the electrical insulator to the polymer coating and finally to the gaseous environment. This continuous change in the value of the dielectric constant across the polymer coating is obtained by varying the process parameters during the polymerization process as discussed above. The slope of the dielectric constant curve is not significant. It is important, however, that the dielectric constant values across the interfaces are nearly the same so that corona will be eliminated and degradation of the insulator will be minimized. Additional coating requirements, such as a void-free boundary and a large breakdown strength, are generally met by plasma polymerization coatings. As can be seen from FIG. 3b, which is a plot of electric field versus distance for an organic electrical insulator coated in accordance with the present invention, the change in value of the electric field at the interface between the polymer coating and the surrounding gas is reduced as it was with the prior art coatings, but it changes gradually to the same relatively large value at the coating-insulator interface. Use of a dielectric polymer coating having such a gradually changing constant value significantly reduces the decomposition of the organic insulator.

Figure 4:
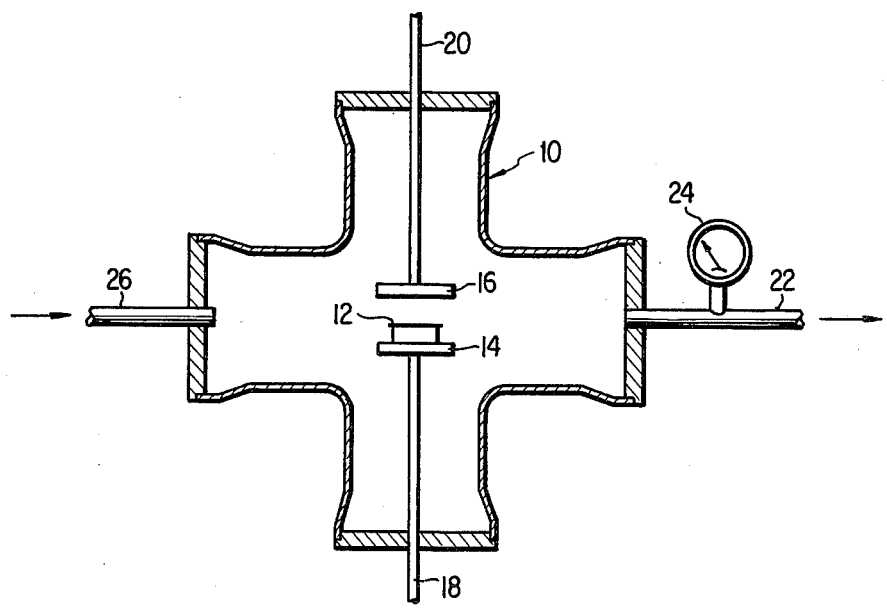
FIG. 4 is a side elevational view of an apparatus which can be used in preparing dielectric coatings in accordance with the process of the present invention.

Using a reactor such as that shown in FIG. 4, a substrate can be coated with a polymer film in accordance with the plasma polymerization process of the present invention. The substrate to be coated, such as an organic electrical insulator or other metallic or non-metallic substrate 12 is placed inside the closed reactor, generally designated as 10, and supported on a temperature-controlled copper electrode 14 such that the substrate is between electrode 14 and a temperature-controlled counterelectrode 16. The electrode leads 18 and 20 are connected to a DC power supply or to a variable frequency AC power supply, not shown. The electrodes are maintained at the desired temperature by circulating water from a controlled temperature bath, also not shown, through the electrodes. The closed reactor 10 is then evacuated through vacuum line 22 to a background pressure of about $10^{-2}$ torr as read on gauge 24. A monomer gas, such as allylamine, or a gas mixture of a monomer and diluent, such as ethylene and nitrogen, is then allowed to flow into the reactor through inlet tube 26 until the desired pressure is reached. The power is then turned on and plasma is generated by means of the electromagnetic energy applied between the electrodes 14 and 16. During deposition of the polymer coating, the closed reactor 10 is continuously pumped through vacuum line 22. Following the deposition period, the monomer or monomer and diluent flow are discontinued, the vacuum in the reactor is broken, and the coated substrate is removed.

A more complete appreciation of the invention will be realized by reference to the following specific examples relating to specific compounds and the process for polymerizing them. The following examples are not intended to limit the invention disclosed herein except to the extent that limitations are specifically stated or to the extent to which limitations appear in the appended claims.

EXAMPLES 1-8

For each of eight runs, a piece of silver foil of known weight and area was placed inside a reaction vessel similar to that shown in accompanying FIG. 4 and supported on a temperature-controlled copper electrode such that the foil substrate was between the supporting electrode and another temperature-controlled copper counterelectrode. The temperature was vaired between 0° C. and 68° C. The electrode leads were connected to a variable frequency AC power supply. The closed reactor was then evacuated to a background pressure of about $10^{-2}$ torr and maintained throughout the deposition process. Allylamine gas was then allowed to flow into the reactor until the desired pressure between about 0.06 and about 1.35 torr was reached. The variable frequency AC power supply was turned on at a frequency of 10 KHz and plasma was generated between the electrodes causing deposition of a polyallylamine coating onto the silver foil. Time of deposition was used to control the coating thickness. The current density was varied between 20 $\mu A/cm^2$ and 300 $\mu A/cm^2$, but was held constant for any given example. Following the deposition period, the flow of allylamine gas was discontinued, the vacuum was broken and the coated foil removed. The value of the dielectric constant for each of the polyallylamine coatings was calculated from capacitance values using impedance bridges (General Radio Co. Models 1605A or 1608A). Coating thicknesses were calculated from the weight gain or the silver foil of known area and the coating density. Coating density was either determined using a density gradient column or estimated. Values for the allylamine pressures, temperatures, current densities, and dielectric constants for the eight runs are set forth in Table I below. As can be seen from Example Nos. 1-3 and 7 and 8, for example, an increase in the current density from 20 $\mu A/cm^2$ to 113 $\mu A/cm^2$ while maintaining the other parameters constant resulted in an increase in the value of the dielectric constant from 5.5 to 6.8, and similarly an increase in the current density from 170 $\mu A/cm^2$ to 300 $\mu A/cm^2$ increased the value of the dielectric constant from 6.0 to 7.1. As can be seen from Examples Nos. 3-4 and Nos. 5-6 variations in the temperature of the silver foil substrate had only a small effect on the values of the dielectric constant.

TABLE I

| PLASMA POLYMERIZATION OF ALLYLAMINE | | | |
|---|---|---|---|
| Example Number | Monomer Pressure, torr | Temperature, °C. | Current Density, $\mu A/cm^2$ Rms | Dielectric Constant ($\epsilon$) |
| 1 | 0.06 | 20 | 20 | 5.5 |
| 2 | 0.06 | 20 | 50 | 6.0 |
| 3 | 0.06 | 20 | 113 | 6.8 |
| 4 | 0.06 | 0 | 113 | 7.0 |
| 5 | 0.22 | 20 | 66 | 5.7 |
| 6 | 0.22 | 68 | 66 | 6.1 |
| 7 | 1.35 | 68 | 170 | 6.0 |
| 8 | 1.35 | 68 | 300 | 7.1 |

AC electric field frequency, 10 KHz.

EXAMPLES 9-11

Following the procedure of Examples 1-8 for each of three additional runs, a piece of silver foil was placed inside a reaction vessel similar to that shown in FIG. 4 and supported between two temperature-controlled copper electrodes maintained at a temperature of about 20° C. A gas mixture of ethylene and nitrogen was then allowed to flow into the reactor until the desired total pressure between about 0.2 and about 0.6 torr was reached. The partial pressure of ethylene was maintained at about 0.2 torr in each run and the partial pressure of nitrogen was varied between 0 torr and about 0.4 torr. The variable frequency AC power supply was turned on at a frequency of 13.56 MHz and plasma was generated between the electrodes causing deposition of a polymer coating of ethylene and nitrogen onto the silver foil. Following completion of the procedure outlined in Examples 1-8 above, the value of the dielectric constant for each of the polymer coatings was calculated. Values for the ethylene and nitrogen partial pressures, temperatures, current densities and dielectric constants for the three runs are set forth in Table II below. As can be seen from this data, an increase in th current density from about 1700 $\mu A/cm^2$ to about 6280 $\mu A/cm^2$ and an increase in the partial pressure of nitrogen from 0 to about 0.4 torr resulted in an increase in the value of the dielectric constant from about 3.3 to about 5.9.

TABLE II

PLASMA POLYMERIZATION OF ETHYLENE AND NITROGEN

| Example Number | Partial Pressure Ethylene, torr | Partial Pressure Nitrogen, torr | Temperature °C. | Current Density $\mu A/cm^2$ Rms | Dielectric Constant ($\epsilon$) |
|---|---|---|---|---|---|
| 9 | 0.2 | 0 | 20 | 1700 | 3.3 |
| 10 | 0.2 | 0.2 | 20 | 5650 | 4.1 |
| 11 | 0.2 | 0.2 | 20 | 6280 | 5.9 |

AC electric field frequency, 13.56 MHz

EXAMPLE 12

A piece of organic insulator is placed inside a reaction vessel similar to that shown in FIG. 4 and supported on a temperature-controlled copper electrode such that the insulator substrate is between the supporting electrode and another temperature-controlled counterelectrode. The temperature of both electrodes is held constant at 20° C. by circulating cooling water from a controlled-temperature bath through both electrodes. A vacuum is maintained within the closed reactor during the deposition process. The reactor is then back-filled with allylamine monomer to a pressure of 0.06 torr. The electrode leads are connected to a variable frequency AC power supply and plasma is initiated by applying sufficient 10 KHz voltage across the electrodes to yield a current density of 113 $\mu A/cm^2$ Rms. The allylamine vapor is allowed to flow continuously through the reactor during deposition. The current density is then continuously decreased over a period of about 17 minutes to 20 $\mu A/cm^2$ by decreasing the applied voltage. The power is then shut off, the flow of allylamine vapor is turned off, the reactor is evacuated and then back-filled with air. This deposition process yields an allylamine polymer film having a gradually decreasing value of its dielectric constant from that of 6.8 at the organic insulator-dielectric coating interface to that of 5.5 at the dielectric coating-air interface.

EXAMPLE 13

A piece of organic insulator is placed inside a reaction vessel similar to that shown in FIG. 4 and supported between two temperature-controlled copper electrodes which are maintained at a temperature of about 20° C. as in Example 12 above. A vacuum is maintained within the closed reactor during the deposition process. The reactor is then back-filled with ethylene monomer to a partial pressure of 0.2 torr. Nitrogen gas is then allowed to flow through the reactor at an initial partial pressure of 0.4 torr. The electrode leads are connected to a variable frequency AC power supply and plasma is initiated by applying RF power across the electrodes at a frequency of 13.56 MHz. While the partial pressure of ethylene is maintained at 0.2 torr throughout deposition, the nitrogen partial pressure is continuously decreased over a period of about 17 minutes to 0 torr. As the nitrogen partial pressure is gradually decreased, the current density tends to decrease so that the voltage must be adjusted to maintain the power constant at 15 watts. When the nitrogen partial pressure reaches zero, the power is shut off, the flow of ethylene is turned off, the reactor is evacuated and then back-filled with air. This deposition process yields a dielectric polymer film having a gradually decreasing value of its dielectric constant from that of 5.9 at the organic insulator-dielectric coating interface to that of 3.3 at the dielectric coating-air interface.

What is claimed is:

1. A process for the production of a non-conductive substrate coated with a polymer coating that is deposited on said substrate from the monomeric state and is resistant to corona discharge, comprising
    disposing a non-conductive substrate in a closed reactor between two temperature-controlled electrodes which are connected to a power supply,
    maintaining a vacuum within the reactor,
    establishing an atmosphere of monomer gas or monomer gas and diluent gas about the substrate,
    generating a plasma between the electrodes, thereby polymerizing the monomer gas or the monomer gas and diluent and depositing the polymerized substance on the substrate, and
    during the deposition, varying in one direction continuously or in stages at least one parameter selected from the group consisting of the gas partial pressures, the electric field strength and frequency and the current density, thereby producing a coated substrate wherein the coating is characterized by having a dielectric constant gradient, the variation in parameter being such as to initially produce on the substrate a polymeric stratum that has a dielectric constant closely approximating that of the substrate and to produce finally a surface stratum remote from the substrate that has a dielectric constant closely approximating that of the use environment.

2. The process of claim 1 wherein the monomer gas is a polar saturated or unsaturated nitrogen-containing compound.

3. The process of claim 1 wherein the nitrogen-containing compound is a nitrile or an amine.

4. The process of claim 3 wherein the amine compound is allylamine.

5. The process of claim 1 wherein the dielectric constant of the polymer cooling is decreased or increased gradually by a correspondingly continuous or stepwise decrease or increase in the current density.

6. A device consisting of a non-conductive substrate coated with a polymeric layer, said layer being characterized by a dielectric constant gradient achieved by deposition according to the process of claim 1.

7. The process of claim 1 wherein the monomer gas is a saturated or unsaturated aliphatic hydrocarbon and the diluent gas is nitrogen.

8. The process of claim 7 wherein the hydrocarbon gas is ethylene.

9. The process of claim 1 wherein the dielectric constant of the polymer cooling is decreased or increased gradually by a correspondingly continuous or stepwise decrease or increase in the current density.

10. The process of claim 1 wherein the dielectric constant of the polymer coating is decreased or increased gradually by a correspondingly continuous or stepwise decrease or increase in the partial pressure of one of the gases in the mixture.

11. The process of claim 1 wherein the nature of the monomer gas is varied during the deposition.

* * * * *